United States Patent
Green et al.

(10) Patent No.: US 11,459,626 B2
(45) Date of Patent: Oct. 4, 2022

(54) FLASH IRONMAKING DROP TUBE FURNACE SYSTEM

(71) Applicant: AMERICAN IRON AND STEEL INSTITUTE, Washington, DC (US)

(72) Inventors: Edward Green, Sewickley, PA (US); Danyang Li, Pittsburgh, PA (US)

(73) Assignee: American Iron and Steel Institute, Washington, DC (US)

(*) Notice: Subject to any disclaimer, the term of this patent is extended or adjusted under 35 U.S.C. 154(b) by 574 days.

(21) Appl. No.: 16/384,015

(22) Filed: Apr. 15, 2019

(65) Prior Publication Data

US 2020/0048724 A1 Feb. 13, 2020

Related U.S. Application Data

(60) Provisional application No. 62/717,043, filed on Aug. 10, 2018.

(51) Int. Cl.
  *C21B 13/00* (2006.01)
  *F27B 1/00* (2006.01)

(52) U.S. Cl.
  CPC ...... *C21B 13/0026* (2013.01); *C21B 2100/66* (2017.05)

(58) Field of Classification Search
  CPC .......... Y02P 10/10; Y02P 10/134; F27D 3/00; F27D 7/02; F27D 1/00; F27D 2003/0006;
  (Continued)

(56) References Cited

U.S. PATENT DOCUMENTS 2,178,773 A * 11/1939 Benner ................ C01B 32/956
  423/345
2,831,759 A * 4/1958 Osborn ............... C21B 13/0033
  75/447

(Continued)

FOREIGN PATENT DOCUMENTS

CN 101603132 B 5/2011
CN 103409579 A * 11/2013 ......... C21B 13/0073

(Continued)

OTHER PUBLICATIONS

Feng Chen, Yousef Mohassab, Tao Jiang, Hong Yong Sohn, Hydrogen Reduction Kinetics of Hematite Concentrate Particles Relevant to a Novel Flash Ironmaking Process, 2015, Metallurgical and Materials Transactions B, 46, 1133-1145 (Year: 2015).*

(Continued)

*Primary Examiner* — Vanessa T. Luk
*Assistant Examiner* — Nikolas Takuya Pullen
(74) *Attorney, Agent, or Firm* — Venable LLP (57) ABSTRACT

A flash ironmaking drop tube furnace includes a primary reaction section having a refractory, an induction coil around the refractory, insulation located between the refractory and the induction coil, and a susceptor located inside the refractory, the susceptor being formed of a material that is heated by induction when electrical current flows through the induction coil, and having at least one interior channel through which particles can pass. The furnace further includes a muffle, located below the primary reaction section; an outer shell surrounding the muffle; at least one heater located adjacent to the muffle; insulation located between the at least one heater and the outer shell; at least one particle feeder that feeds a predetermined volume of particles into the furnace above the primary reaction section; and an inlet port for injecting gas into the furnace, the inlet (Continued)

port being located so that the gas flows through the susceptor and muffle in parallel with the particles.

15 Claims, 7 Drawing Sheets

(58) Field of Classification Search
CPC ....... C21B 13/00; C21B 13/02; C21B 13/029; C21B 13/04; C21B 13/004; C21B 13/0073; C21B 2100/66; C21B 5/00; C21B 5/001; C21B 5/002; C21B 5/003; C21B 2005/005; C21B 11/00; C21B 11/02; C21B 11/06; C21B 11/08; C21B 11/10; C21B 13/0006; C21B 13/0013; C21B 13/002; C21B 13/0026; C21B 13/0033; C21B 13/006; C21B 13/0086; C21B 13/023; C21B 13/026; C21B 13/06; C21B 13/12; C21B 13/125; C21B 13/14; C21B 13/146; C11B 11/00; C11B 11/10; B65B 1/00; B65B 1/04; B65B 1/06; B65B 1/08; B65B 1/10
See application file for complete search history.

(56) References Cited

U.S. PATENT DOCUMENTS

| | | | |
|---|---|---|---|
| 3,822,125 A | 7/1974 | Roberts | |
| 4,062,673 A | 12/1977 | Roberts | |
| 4,798,532 A | 1/1989 | Kimura et al. | |
| 2005/0069015 A1* | 3/2005 | Bogdahn | C03B 23/043 373/111 |
| 2013/0239523 A1* | 9/2013 | Scudder | B65D 90/047 53/467 |
| 2018/0036804 A1 | 2/2018 | Reid | |

FOREIGN PATENT DOCUMENTS

| | | | | |
|---|---|---|---|---|
| CN | 103993116 A | | 8/2014 | |
| CN | 104451015 A | | 3/2015 | |
| CN | 104004958 B | * | 12/2015 | ............. C22C 33/04 |
| CN | 104004958 B | | 12/2015 | |
| CN | 105546994 A | * | 5/2016 | ............. F27D 3/00 |
| CN | 105755503 A | | 7/2016 | |
| CN | 205710868 U | | 11/2016 | |
| CN | 106918686 A | * | 7/2017 | ............. G01N 33/24 |
| CN | 106918686 B | * | 7/2019 | ............. G01N 33/24 |
| DE | 20203213 U1 | | 9/2002 | |
| GB | 2148866 A | * | 6/1985 | ............. D01F 9/32 |
| WO | 2006079132 A1 | | 8/2006 | |
| WO | 2016173248 A1 | | 3/2016 | |

OTHER PUBLICATIONS

International Search Report and Written Opinion issued in corresponding PCT Application No. PCT/US2019/042316 dated Sep. 24, 2019.
"Flash steelmaking and net zero emission," www.tshant.com, Sep. 2020, pp. 1-10.
"High-Temperature Falling Particle Receiver", Clifford K. Ho., Sandia National Laboratories, CSP Program Summit, SunShot U.S. Department of Energy, 2016.
"Update on Falling Particle Receiver Research at Sandia", Clifford K. Ho., Sandia National Laboratories, U.S. Department of Energy, 2015.
"Shape of a Particle Curtain falling in Stagnant Air", Chrestella Wardjiman, et al., Powder Technology, 192 (2009), Elsevier, pp. 384-388.
"System design of a 1 MW North-Facing, Solid Particle Receiver", J. Christian, C. Ho., Energy Procedia 69 (2015), International Conference on Concentrating Solar Power and Chemical Energy Systems, SolarPACES, 2014, pp. 340-349.
"Technology Advancements for Next Generation Falling Particle Receivers", C. Ho., et al., Energy Procedia 49 (2014), SolarPACES, 2013, pp. 398-407.

* cited by examiner

FLASH IRONMAKING DROP TUBE FURNACE SYSTEM

CROSS-REFERENCE TO RELATED APPLICATION

This application claims priority to U.S. Provisional Application No. 62/717,043, filed on Aug. 10, 2018, which is incorporated herein in its entirety.

STATEMENT OF GOVERNMENT INTEREST

This invention was made with government support under Cooperative Agreement No. DE-EE0005751 awarded by the United States Department of Energy. The government has certain rights in the invention.

BACKGROUND OF THE INVENTION

Field of the Invention

The present disclosure relates to a method and apparatus for reducing iron ore to iron, and more specifically to method and apparatus for reducing particles of iron ore to iron using a flash ironmaking process.

Description of the Prior Art

There are two main chemical reductants employed when reducing iron ore to iron. These are hydrogen (H2) and carbon monoxide (CO). In a conventional blast furnace, CO is the main reductant. More specifically, a conventional blast furnaces uses coke, and the oxygen in air, steam, or water combines with the carbon in the coke to form CO. More modern DRI (Direct Reduction Iron) furnace systems use a combination CO and H2 to reduce the iron ore to iron.

The chemical reactions are as follows:

$$Fe_3O_4 + CO = 3FeO + CO_2$$

$$FeO + CO = Fe + CO2$$

$$Fe_3O_4 + H_2 = 3FeO + H_2O$$

$$FeO + H_2 = Fe + H_2O$$

In a blast furnace, the iron oxide (together with fluxes, such as limestone, and the requisite amount of carbon) passes down through the furnace countercurrent to a blast of air. As described in U.S. Pat. No. 3,822,125, this results in several problems. First, the carbon (in the form of coke) has to be in lump form, because otherwise it gets blown out of the blast furnace by the countercurrent blast of air, thereby presenting a problem of dust loss and particulate emission. In addition, coke can be produced only from certain coals, which are known as coking coals and which are considerably more expensive than non-coking coals. The cost may be further increased by transportation of the coke from a distance. The cost of the coking operation adds to the overall expense and presents increasingly serious problems of emissions.

For similar reasons as to why the coke must be in lump form, the iron bearing raw material likewise must be in lump form. If the raw material is finely divided, then like the coke it is blown out of the blast furnace by the countercurrent blast of air. The need for the raw material in a blast furnace to be in lump form raises a number of practical problems, particularly with iron oxide concentrates from lower grade ores, such as taconite, which are becoming increasingly important sources of iron ore in many parts of the United States. These concentrates (for example concentrates from magnetic taconites) contain relatively fine particles because it is necessary to employ fine grinding to liberate the iron oxide values. Such fine particulate material is completely unsuitable for blast furnace use, and so it has been necessary to agglomerate the finely divided iron oxide material into sintered pellets or briquettes. As a result of the above-mentioned problems, reduction of finely divided concentrates without pelletizing has not achieved widespread use, and processes using the old style blast furnaces are still the major ones for iron ore reduction. The cost of the pelletizing or briquetting, while not prohibitive, is nevertheless substantial and reduces the economic value of the low grade iron ores.

The more modern DRI furnace systems perform ore reduction using a counterflow syngas stream to reduce the ore without melting it. The counterflow gas stream is subject to the same issues as the blast furnace discussed above, where it is necessary to perform pelletizing or briquetting of the ore to prevent the ore particles from being blown out of the furnace.

In view of the problems discussed above, other processes for reducing iron ore to iron have been investigated. For example, the aforementioned U.S. Pat. No. 3,822,125 discloses a flash ironmaking system for reducing falling particles containing iron ore to iron. Similarly, U.S. Pat. No. 4,062,673 discloses a flash smelting system for reducing falling particles containing iron ore to iron in a vertical shaft. However, these prior art systems suffer from various drawbacks that prevent them from being economically viable systems for large-scale iron production. For example, such systems may become too hot such that the particles melt, they may suffer from clogs, they use a dense particle curtain in which particles strike each other, disrupting their respective paths and possibly causing particles (which may be magnetic) to stick to the sides of the vertical shaft and cause clogs.

In another field, a system developed at Sandia National Laboratories uses falling particles of sand to absorb and store solar energy. However, this system likewise uses a dense flow because interaction among the falling particles is acceptable for the purpose of absorbing the solar energy.

Figure 9:
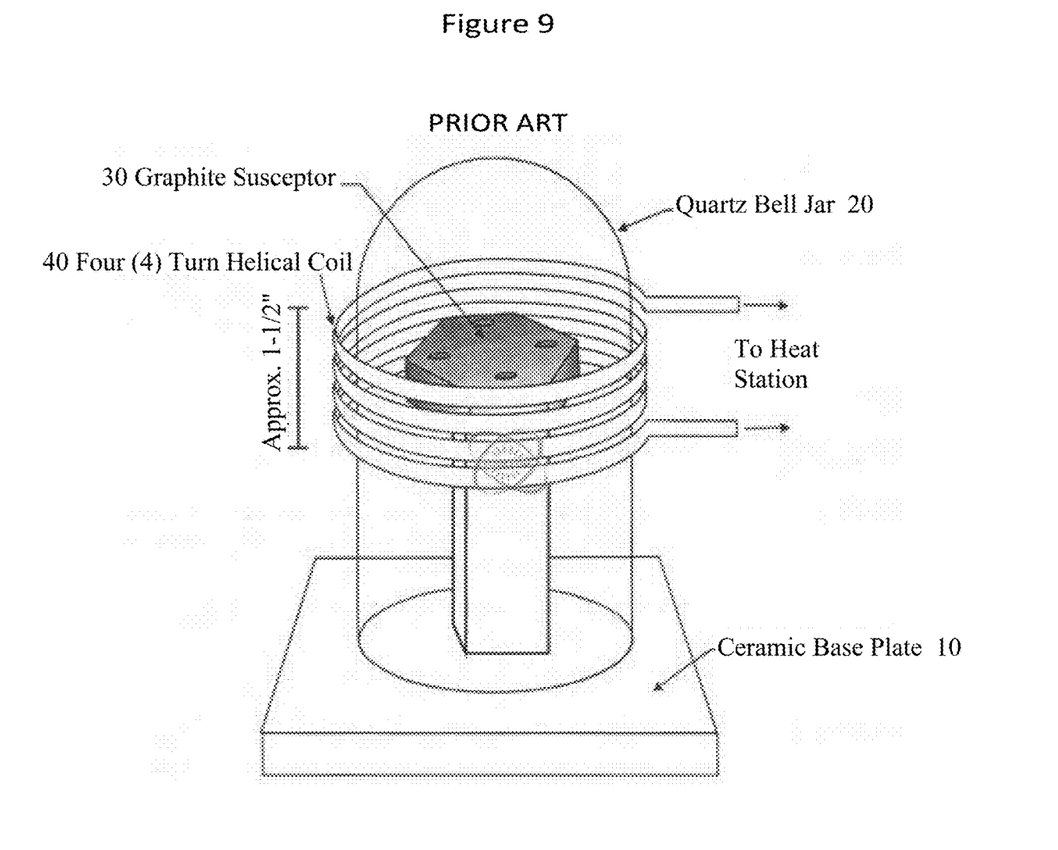
FIG. 9 shows a prior art system for heating materials resting on a graphite susceptor using induction heating.

Another technique investigated for flash ironmaking involves the use of a graphite susceptor heated by induction heating. For example, the graphite susceptor is contained in a glass jar surrounded by coils to perform induction heating. Materials in the form of metal rings or bars are heated while resting on the graphite susceptor. FIG. 9 shows an example diagram of such a system, which includes a ceramic base plate 10, a quartz bell jar 20, a graphite susceptor 30, and a four-turn helical coil 40 surrounding the quartz bell jar. As will be apparent from FIG. 9, this type of system is not suitable for large-scale ironmaking, since only the materials resting on the graphite susceptor are heated.

Thus, although various techniques have been used and/or investigated for making iron, there remains a need for a method and system that can reduce iron ore to iron in an efficient manner even when the raw material is in the form of fine particles.

SUMMARY OF THE INVENTION

According to a preferred embodiment, the present invention is directed to a flash ironmaking drop tube furnace in which particles containing iron ore are converted to iron while falling in a dilute curtain that is heated by indirect heating.

More specifically, according to one aspect of a preferred embodiment, a flash ironmaking drop tube furnace includes a primary reaction section having a refractory, an induction coil around the refractory, insulation located between the refractory and the induction coil, and a susceptor located inside the refractory, the susceptor being formed of a material that is heated by induction when electrical current flows through the induction coil, and having at least one interior channel through which particles can pass. The furnace further includes a muffle, located below the primary reaction section; an outer shell surrounding the muffle; at least one heater located adjacent to the muffle; insulation located between the at least one heater and the outer shell; at least one particle feeder that feeds a predetermined volume of particles into the furnace above the primary reaction section; and an inlet port for injecting gas into the furnace, the inlet port being located so that the gas flows through the susceptor and muffle in parallel with the particles.

According to another aspect of a preferred embodiment, a flash ironmaking drop tube furnace system includes a primary reaction section having a refractory, an induction coil around the refractory, insulation located between the refractory and the induction coil, and a susceptor located inside the refractory, the susceptor being formed of a material that is heated by induction when current flows through the induction coil, and having at least one interior channel through which particles can pass. The system further includes a muffle, located below the primary reaction section; an outer shell surrounding the muffle; at least one heater located adjacent to the muffle; insulation located between the at least one heater and the outer shell; a particle feeder that feeds a predetermined volume of particles into the furnace system above the primary reaction section; an inlet port for injecting gas into the furnace system, the inlet port being located so that the gas flows through the susceptor and muffle in parallel with the particles; and a particle preheating section that preheats the particles before the particle feeder feeds them into the furnace system.

According to still another aspect of a preferred embodiment, a flash ironmaking method comprises feeding particles into a drop tube furnace; introducing hydrogen gas into the drop tube furnace so that it flows parallel to the falling particles; heating a susceptor using induction heating, so that the particles are heated as they fall through the susceptor; heating a muffle, to maintain the temperature of the particles as they fall through the muffle; and cooling the particles and hydrogen gas after they pass through the muffle.

Further aspects of the present invention will be understood from the detailed description of preferred embodiments below, taken in conjunction with the accompanying figures.

DETAILED DESCRIPTION OF THE PREFERRED EMBODIMENTS

According to one preferred embodiment, the flash ironmaking method and system described herein reduces iron oxide ores in particle form or concentrate to iron while the particles are falling through a drop tube furnace with a parallel flow of reducing gas, instead of a counterflow of air or gas as described above with respect to blast furnace and DRI techniques. By using parallel gas flow, the drawbacks described above due to a countercurrent are avoided. For simplicity, in the remaining portion of the text the iron oxide will be referred to as FeO, although it should be realized that in the case of beneficiated iron concentrates from magnetic taconite, for example, the iron oxide is largely magnetite, hematite or other iron oxide. For the functioning of the preferred embodiment described below, it does not make any difference whether the iron oxide is magnetite, hematite or another iron oxide. Although the ideal proportions of the reactants varies with the chemical makeup of the particular iron oxide used as a raw material in the process, this proportion can be easily varied depending on the source.

Figure 1:
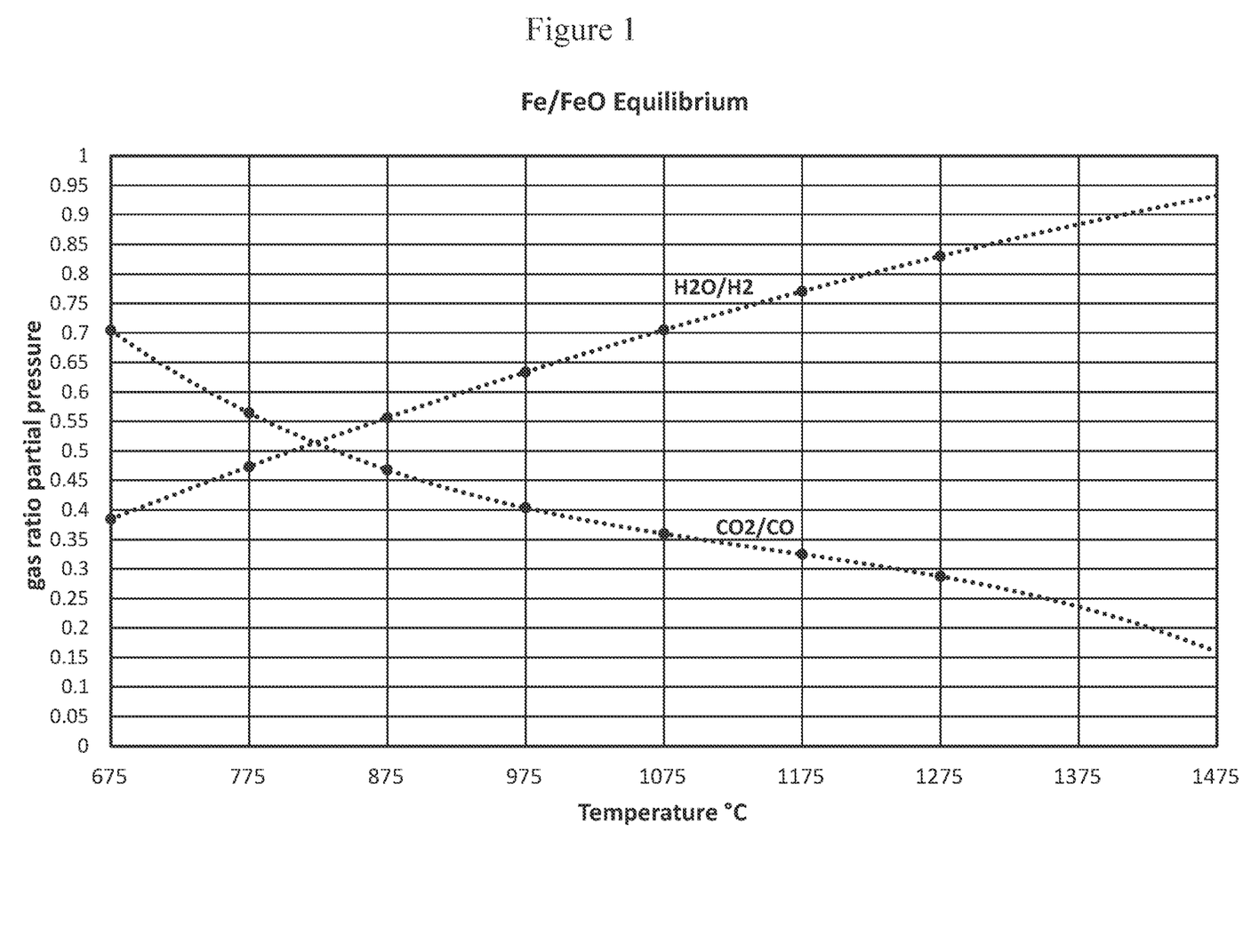
FIG. 1 is a Fe/FeO equilibrium diagram showing the equilibrium lines of $H_2O/H_2$ and $CO_2/CO$.

It is well known that the reactions for reducing iron ore to iron are endothermic and heat must be added to the system to sustain the reactions. FIG. 1 is a Fe/FeO equilibrium diagram showing the equilibrium lines of $H_2O/H_2$ and $CO_2/CO$. From FIG. 1 it can be seen that CO is more effective at reducing iron ore at low temperatures than it is at high temperatures. On the other hand, it can be seen that $H_2$ is more effective at reducing iron ore at high temperatures than it is at low temperatures. The crossover at which CO and $H_2$ are equally effective at reducing iron ore to iron occurs around 825° C. Furthermore, it is well known that the rate of chemical reaction generally increases as the temperature is increased, and the reduction of iron ore to iron is not an exception to this generalization.

The conversion of iron ore to iron should occur while the iron ore particles are falling/suspended in the air for the process to be most effective. By the nature of the falling process, the particles will be suspended for only seconds and the process only has enough time to take place at high temperatures.

From FIG. 1 it can be seen that hydrogen is the preferred reductant at high temperatures. Furthermore, hydrogen is preferable to CO as a reducing gas for other reasons. For example, using thermodynamic calculations it can be determined that CO requires substantial excess gas to get to chemical equilibrium and this excess gas requires significant energy to heat to temperature. Furthermore, large quantities of CO, when cooled, form $CO_2$+C. Deposition of this carbon can create buildup and plugging. Moreover, the amount of CO that forms the $CO_2$+C reduces the available quantity of CO for recycling, thus lowering overall system efficiency. Therefore, one preferred embodiment of the flash ironmaking furnace described herein uses 100% $H_2$ for reaction purposes. However, a combination of majority $H_2$ with a small amount of CO may be used.

One preferred embodiment of a flash ironmaking system will be described with respect to FIGS. 2 through 7. According to this preferred embodiment, the flash ironmaking system has a drop tube furnace in which an iron ore falling particle curtain is brought to the desired reaction temperature through the use of indirect heating. More specifically, indirect heating is provided in two sections of the furnace, namely, a susceptor (which in this preferred embodiment is a graphite susceptor) and a muffle.

Figure 2:
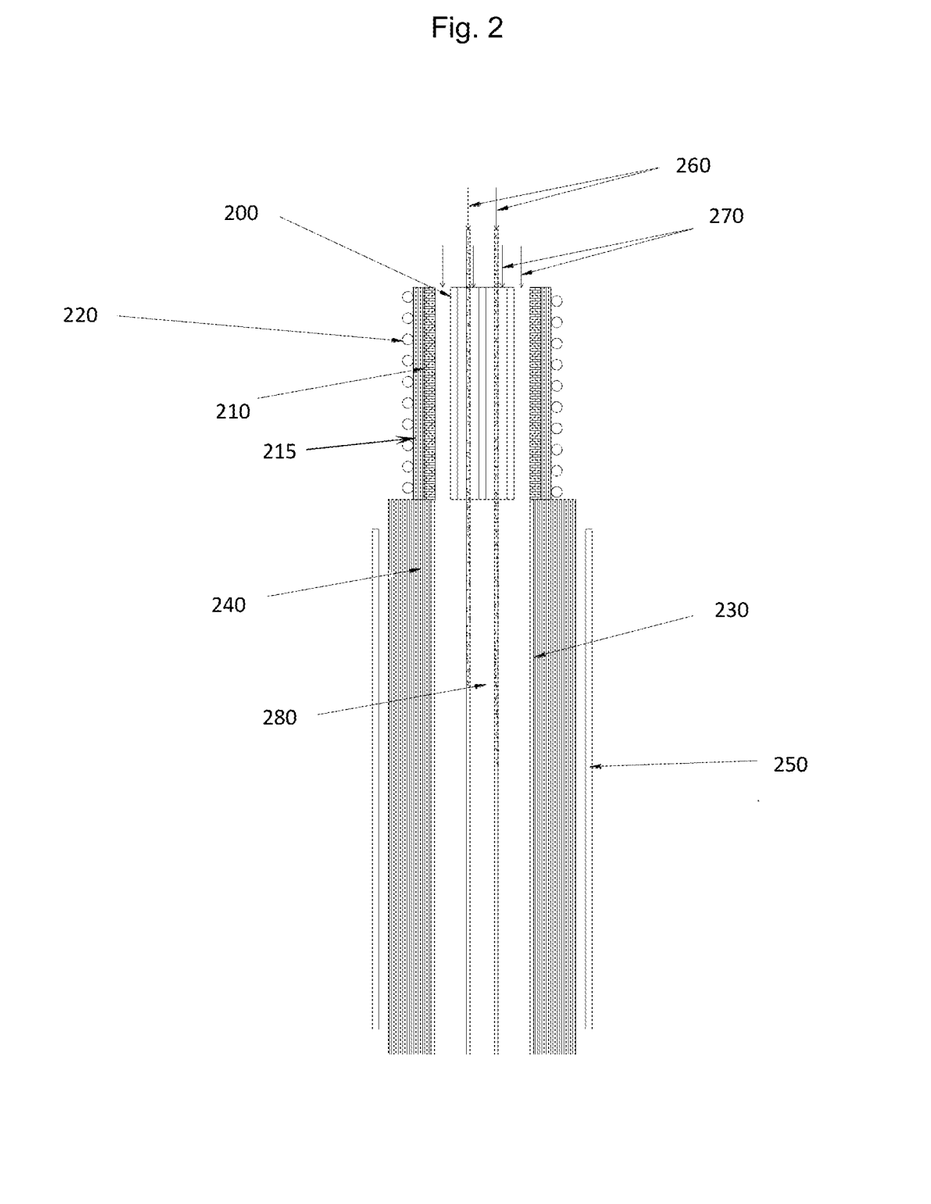
FIG. 2 shows a vertical cross-section of a portion of a furnace system according to one preferred embodiment.

FIG. 2 is a vertical cross-section of a portion of the drop tube furnace system according to this preferred embodiment. As shown in FIG. 2, a susceptor 200 is contained within a refractory 210 having insulation 215. In this preferred embodiment, the susceptor 200 is made of graphite. An induction coil 220 surrounds the refractory 210, insulation 215, and susceptor 200. Below those elements is a muffle 230 that is surrounded by insulation 240. Outside of the insulation 240 are heaters 250, which may be, for example, induction heaters or resistance heaters. As shown in FIG. 2, curtains of particles (260) containing iron ore pass through the susceptor 200, and hydrogen gas 270 also passes through the susceptor in the same direction as the falling particle curtains 260. (While plural particle curtains are shown and discussed with respect to the preferred embodiment, those skilled in the art will appreciate that a single particle curtain could be used.) After being heated by indirect heating in the susceptor 200, the falling particles continue down through the muffle 230. The interior of the muffle 230 forms a reaction section 280 in which the reaction to transform the iron ore particles to iron continues.

Figure 3:
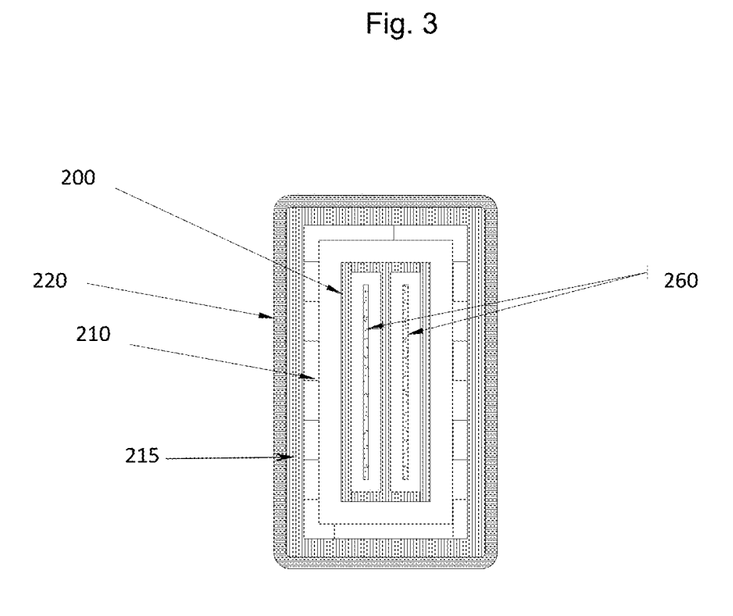
FIG. 3 shows a horizontal cross-section of a portion of a furnace system according to one preferred embodiment.

As mentioned above, the system includes a susceptor 200, which is a graphite susceptor in this preferred embodiment, but it could be made of some other high-temperature electrically conductive material. In operation, susceptor temperature can be around 1500° C., and therefore a suitable material such as graphite is needed that can withstand such high temperatures. FIG. 3 shows a horizontal cross-section of the system through the susceptor 200. The induction coil 220 used to heat the susceptor 200 cannot withstand high operating temperatures, so it must be thermally insulated from the process. It is insulated from the process by a combination of the refractory 210 and insulation 240. In this preferred embodiment, the insulation 240 takes the form of thermal insulating blankets.

Heating of the particles in particle curtains 260 occurs as follows. The graphite susceptor is immersed in the hydrogen/FeO particle stream. The electromagnetic waves from the induction coil 220 interact with the graphite susceptor 200, causing it to heat up. However, the electromagnetic waves pass through the refractory 210 and insulation 240 unimpeded. The FeO particles are heated by the graphite susceptor 200 by radiation heating, and the refractory 210 is likewise heated by the graphite susceptor 200 by radiation heating. The hydrogen gas is heated by the graphite susceptor 200 and the refractory 210 by convective heating. (In other words, the particles in the particle curtains 260 do not contact the susceptor 200 or the refractory 210, but the hydrogen gas does contact the surfaces of the susceptor 200 and the refractory 210 as it flows past them.)

By heating using induction, several issues that occur with combustion heating are overcome. For example, combustion creates $H_2O$, which limits the reaction by chemical equilibrium. When combustion is employed, a large excess of hydrogen or carbon monoxide is required to overcome the equilibrium limit to complete the reaction.

The time that it takes the particles to fall through the high temperature section of the furnace is referred to as the residence time. While primary heating of the particles to commence the reaction occurs in the section of the furnace containing the susceptor 200, the particles pass through this section in a very short amount of time. Accordingly, the muffle 230 is provided to increase the residence time by allowing the reaction to continue as the particles fall through the muffle 230. The reaction section 280 of the muffle 230 can be 25 feet in length or longer, and preferable has smooth straight walls. The muffle 230 is preferably formed of carbon composite or some other high-temperature, thermally conductive material, due to the high operating temperature. Furthermore, the muffle should have enough structural strength to hold its shape and to support itself with only some structure for centering and holding insulation. The heaters 250 (for example, resistance heaters or induction heaters) are installed on the outside of the muffle 230 to provide additional heating, in order to counteract environmental losses or the losses from the endothermic chemical reactions. The heaters 250 can also be set up to create different temperature zones in the muffle 230, if desired.

The particles in the particle curtains 260 are falling at about 1 m/s. Because the particles are falling, the time during which they will be passing through the heating sections to be heated, during which the reaction must occur (i.e., the residence time), is limited. By using a high temperature and adding excess hydrogen, it is possible to achieve a residence time of only 2 seconds and achieve 95% metallization. However, such a configuration is less energy efficient than other configurations. Therefore, it is preferable that the residence time be less than or equal to 10 seconds (although it could be increased to 15 seconds by extending the length of the furnace shaft).

There are a number of factors and elements that help to enhance the ironmaking method according to this preferred embodiment. One factor is that the FeO particles are small in size, so that the reaction can be completed in a short residence time, i.e., in the duration of time it takes the particles to fall through the high temperature section of the furnace. Preferably, the particle or concentrate size is in the range of 5 microns to 50 microns, although slightly larger sizes can be used by increasing excess hydrogen and/or extending the length of the furnace to increase the residence time. In the preferred embodiment, the average particle or concentrate size is generally on the order of 35 microns or less. Because the particles converted by the drop furnace can have sizes with this order of magnitude, it is possible to use fine FeO concentrates, such as those made from low grade ores (such as taconites), without the additional expense of sintering or pelletizing. Particle size is assessed by sending a sample to a laboratory equipped with a particle counter. Sampling is generally done at least once for each mine the ore is purchased from. It is possible to use material other than virgin FeO concentrate. For example, in other aspects of the iron industry "Fines" are created from material handling of DRI pellets and briquettes. These fines are currently transported for disposal, but they can be recovered and used in the flash ironmaking process. The fines are generally coarse in nature with a wide range of sizes from 5 micron to ¼" inch. These fines can be sent through a grinding operation just as the taconite ore and they are processed to a 5 to 50 micron size that is preferred for the flash ironmaking system described in this preferred embodiment.

Another factor is that the particles while falling should be spread apart for an even, dilute flow (as opposed to a dense flow). The particle curtains should ensure that the stream of particles is spread evenly, because slugs of flow will cause localized shortages of reaction gas that will not allow all particles to be reduced. Furthermore, in the preferred embodiment the particle curtains are located roughly midway between susceptor walls, to obtain even radiation heating of the particles and even heat removal from each wall.

Locating the falling particle curtains 260 approximately midway between susceptor walls helps to avoid various potential problems. As mentioned above, the particles are heated by the susceptor 200 via radiation heating. If the positions of the particle curtains 260 were not controlled, particles could fall in a cloud with some touching the wall, some just off the wall, and some midway between the walls. In this situation, the particles would not be heated evenly. The particles touching the wall can reach the wall temperature, which can be 100° C. or more above the gas temperature, and the particles midway between walls would be at the lowest gas temperature. The 100° C. temperature difference between particles could lead to some particles melting while other particles do not complete the reaction for a given residence time. Using particle curtains located midway between the walls provides even heating for all particles such that the reaction temperatures are in a tightly controlled temperature band. The falling particle curtains can also be positioned at least a desired minimum distance off the muffle walls so that any additional heating that may be done in the muffle will heat all particles evenly. The particle curtains can further be positioned at least a desired minimum distance from the muffle walls, to prevent FeO particles from colliding and sticking to the muffle wall.

Figure 4:
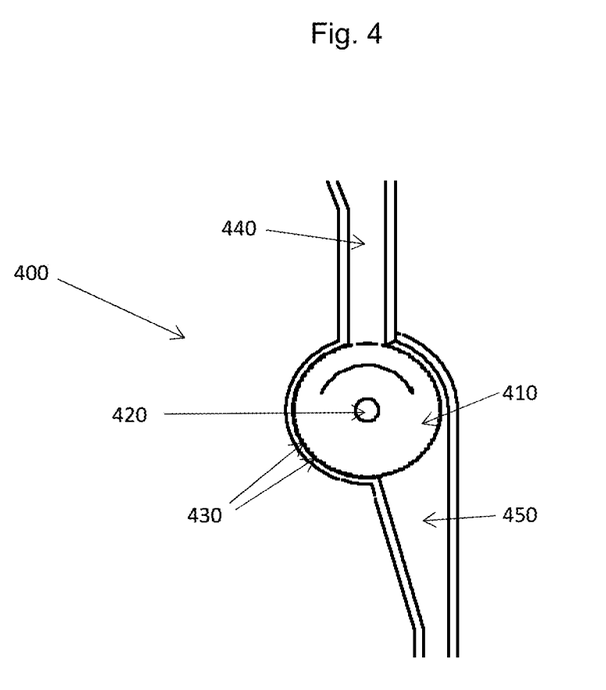
FIG. 4 shows one preferred embodiment of a rotary valve for introducing particles into the top section of the furnace.

To obtain dilute particle curtains, the particles are introduced into the drop furnace above the susceptor in a metered fashion. Preferably, the particles are introduced with a volume flow rate in the range of 1/16 teaspoon per second per inch of curtain length (tsp/s/in) to 1 tsp/s/in, and more preferably with a volume flow rate in the range of 1/8 tsp/s/in to 1/2 tsp/s/in. In the preferred embodiment being described currently, the particles are introduced into the drop furnace at a volume flow rate of 1/4 teaspoon per second per inch to obtain the desired dilute flow. More specifically, in this preferred embodiment the particle curtains are created using a rotary particle feed valve 400. A preferred embodiment of the rotary particle feed valve 400 is shown in FIG. 4. As shown in FIG. 4, a particle curtain is formed using a rotating rod 410 that rotates about an axis 420. The rod 410 has many small grooves 430 machined into its outside surface, which run parallel to the axis 420. The grooves 430 hold a small volume of particles that is easily calculated (for example, by the length and depth of each groove). Particles in an inlet slot 440 fill the grooves and, as the rod 410 rotates, the particles are carried to a discharge slot 450 and fall into the furnace system. By controlling the speed of rotation or rod 410, the number of grooves opening into the discharge slot 450 in a given time period will control the FeO volume flow rate.

It is important to control the FeO volume flow rate both to ensure a dilute flow and to know the volume of particles being introduced into the furnace system. That volume must be known because the proportion of hydrogen gas to FeO volume flow rate is important. If there is too much FeO relative to the amount of hydrogen gas, then the reaction for all FeO cannot be completed in the residence time. On the other hand, if there is too much hydrogen gas relative to FeO, then heating energy will be wasted heating the flow without anything to react with.

Although there should not be too much hydrogen gas relative to the amount of FeO, there must be enough excess hydrogen available to complete the reaction during the residence time. The chemical reactions for reduction and oxidation are reversible, and for each set of operating conditions there is an equilibrium point at which neither oxidation nor reduction is occurring. At this equilibrium point both hydrogen ($H_2$) and water ($H_2O$) will exist and as such the reduction requires more hydrogen than will react. As the ratio of product ($H_2O$) divided by the reactant ($H_2$) approaches this equilibrium point, the rate of reaction decreases, and as the ratio of $H_2O/H_2$ moves away from this equilibrium point, the rate of reaction increases (refer to FIG. 1). Accordingly, it is important to have some excess hydrogen to complete the reaction during the residence time, and the exhaust gas will contain substantial hydrogen gas. The exhaust gas may be recycled by condensing the water out and performing minimum cleanup, for example, in a pressure swing absorber or a temperature swing absorber, to improve efficiency and economics.

Figure 5:
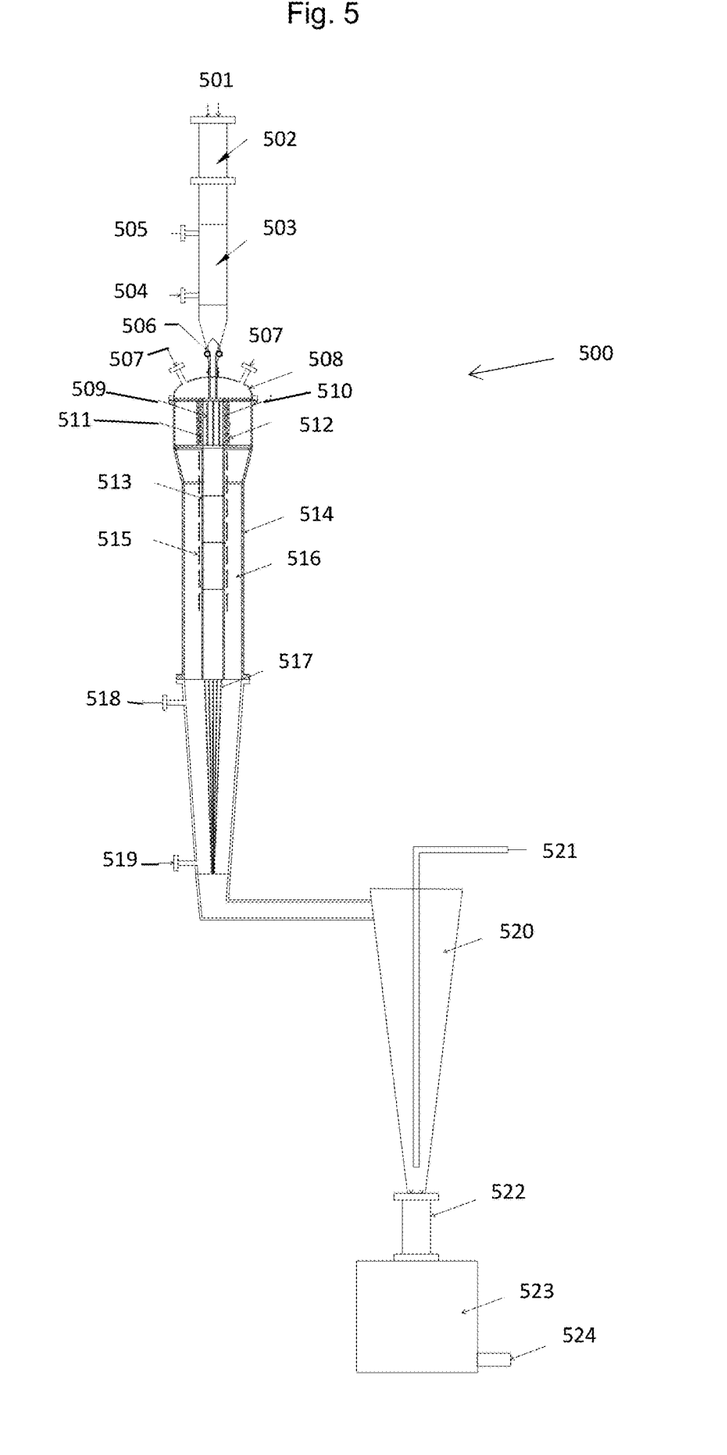
FIG. 5 shows one preferred embodiment of a complete furnace system.

One preferred embodiment of a complete flash ironmaking drop tube furnace system 500 will be described with respect to FIG. 5. In this preferred embodiment, the furnace system 500 includes a particle inlet 501, an inlet lock hopper 502, a particle heat exchanger 503 for preheating particles, a coolant inlet 504 to inject coolant into the particle heat exchanger 503, a coolant outlet 505 to remove coolant from the particle heat exchanger 503, a rotary particle feed valve 506 for discharging iron ore particles in a metered particle curtain, hydrogen inlet(s) 507 for introducing hydrogen into the furnace, a reactor head 508, a hollow susceptor 509, a refractory 510, insulation 511, an induction coil 512, a muffle 513, an outer shell 514, resistance heaters 515, insulation 516, a reactor outlet heat exchanger 517, an outlet 518 for coolant for the reactor outlet heat exchanger 517 to cool the particles and the exhaust gas, an inlet 519 for coolant for the reactor outlet heat exchanger 517, a high efficiency cyclone separator 520 to separate the particles from the exhaust gas, an outlet 521 for exhaust gas from the cyclone separator 520, an outlet lock hopper 522, a bagging machine 523, and an outlet 524 for particles from the bagging machine 523.

According to a preferred embodiment, FeO particles are processed using furnace system 500 as follows. FeO particles are introduced into the furnace system 500 via the inlet 501. The lock hopper 502 provides a means to exchange hydrogen with air when the particles are injected into the system. The lock hopper 502 is incorporated at the inlet 501 of the system to help perform an air-hydrogen exchange. This is well-known technology practiced within the industry to prevent leakage into or out of systems containing explosive gases.

More specifically, an internal valve (not shown) between the lock hopper 502 and the particle heat exchanger 503 is closed, and then an internal valve (not shown) of the lock hopper at the side nearest inlet 501 is opened. Dried and slightly warmed FeO particles are injected into the lock hopper 502. After the lock hopper 502 is filled to the desired level, the internal valve of the lock hopper at the inlet 501 is closed so that no transfer of particles in or gas out of the inlet 501 can occur. $CO_2$ or another inert gas then pressurizes the lock hopper 502 while the air carried in with the particles is vented out.

Hydrogen is then injected into the lock hopper while the $CO_2$ is vented out. All vents are closed, and the internal valve (not shown) between the lock hopper 502 and particle heat exchanger 503 is then opened to allow the FeO ore to drop into the particle heat exchanger 503. The internal valve between the lock hopper 502 and the particle heat exchanger 503 is then closed and the FeO injection process is repeated.

The process is enhanced by preheating of the particles. There are several types of particle heat exchangers available that can preheat the particles. The heat exchanger used in one preferred embodiment is similar to a vertical shell and tube heat exchanger with the particles flowing down through the tubes and the heating fluid flowing on the shell side of the tubes. Due to the large temperature difference in the heat exchanger, expansion joints are incorporated into this heat exchanger. Other examples of heat exchangers include a vertical series of plate exchangers or coiled tubes inside the hopper.

The FeO ore is filled above the top of the particle heat exchanger 503 so that it feeds all heat exchange passageways evenly. Hot coolant enters the bottom of the particle heat exchanger 503 at inlet 504 counterflow to the particles. The coolant then exits the particle heat exchanger at the outlet 505.

The FeO ore leaves the particle heat exchanger 503 and completely fills the cavity above the rotary valve 506. In this preferred embodiment, two rotary valves rotating in opposite directions are used to form two particle curtains. Each rotary valve 506 has numerous small grooves on the outside surface of a rotating rod, and the rod is rotated with a variable speed motor (not shown). The grooves are filled at the 12 o'clock position of the valve by the gravity feed of the particles above. As the valve rotates past the 3 or 9 o'clock positions, depending on direction of rotation, the particles fall out of the grooves and form the beginning of the particle curtains. The speed of rotation of the rotary valve controls the volume of particles injected into the reactor, and this speed is set to maintain a constant injection for an evenly loaded particle curtain. The particles are guided with rectangular ducts to a point just entering the graphite susceptor 509.

With respect to the hydrogen gas, the hydrogen is preheated outside the reactor in a heat exchanger (not shown) using hot coolant from the bottom of the reactor. Hydrogen is injected into inlets 507 in the reactor vessel head 508. The velocity of the hydrogen is controlled such that it enters the susceptor 509 in a smooth laminar flow so as not to disrupt the particle curtain. The FeO particle curtain can fall 30 feet or more in the hot section of the reactor (that is, the susceptor and the muffle) and an additional 25 feet or more in the cooling section of the reactor. If the gas flow is laminar and the FeO particles are very small and the calculated stokes number is much less than 1 and the particles are in dilute flow phase, the FeO particles will follow the streamlines of the hydrogen gas. Without turbulence, the highest velocity is midway between walls and there is very little force to pull the particles to the wall, where they may stick and create plugging issues.

The susceptor 509 (made of graphite in this preferred embodiment) is rectangular shaped and formed to hold two particle curtains. The outside rectangle of the graphite susceptor 509 is magnetically coupled with the induction coil 512 such that the magnetic waves induce current in the susceptor 509 that heat the outside walls of the susceptor 509. These hot walls then radiate heat to the center wall of the susceptor 509 and to the surrounding wall of the refractory 510. The FeO particles drop through the interior of the susceptor 509 and they are heated to temperature by radiated heat as they fall. The hydrogen gas flows both inside the susceptor 509 and outside the susceptor 9 and within the walls of the refractory 10, and the hydrogen gas is heated by convection from all the walls that it flows past.

The induction coil 512 cannot withstand the high operational temperature so it is insulated with insulation 511, which can be formed of, for example, various types of block or felt. By the time the FeO particles and $H_2$ gas get to the bottom of the susceptor 509 they are at operational temperature. The particles continue falling into the next section of the reactor, i.e., the muffle.

The muffle 513 is a vertical, straight, smooth-sided rectangular tube that contains the gas and the particles. The reduction reaction begins while falling through the susceptor 509, but the majority of the reduction from FeO to Fe occurs while the particles are falling through the muffle 513. In the preferred embodiment, the particles are heated to a desired reaction temperature of about 1150° C. to 1325° C. in the susceptor. The time it takes for the reaction to complete (residence time) is controlled by the temperature, the hydrogen to particle ratio, and size of the particles. It is an endothermic reaction that requires heat to be added to maintain the temperature of reaction. Heat can be added by zone heating the muffle 513 using resistance heaters 515. Alternatively, the muffle can be heated with another type of heater such as induction heaters. The heaters 515 also help make up the environmental losses through the insulation 516 and the outer shell 514.

After the reaction is complete, the particles (now Fe) and exhaust gas ($H_2$ and $H_2O$) enter the reactor outlet heat exchanger 517. The reactor outlet heat exchanger 517 is used to cool the particles and gas while still falling. The iron particles will agglomerate when in contact with one another at temperatures above 600° C. If the particles agglomerate they can cause buildup and plugging of the reactor. Furthermore, the exhaust gas now contains both $H_2$ and $H_2O$, and as the flow cools it will cross over the equilibrium line shown in FIG. 1 such that the exhaust gas will begin to reoxidize the Fe back to FeO. At the lower temperature on the oxidizing side of the equilibrium line, the reaction is very slow because the temperature is low. The reoxidation will take a time period that may range from minutes to hours, but nevertheless the particles should be cooled quickly and the $H_2O$ removed from the flow.

Figure 6:
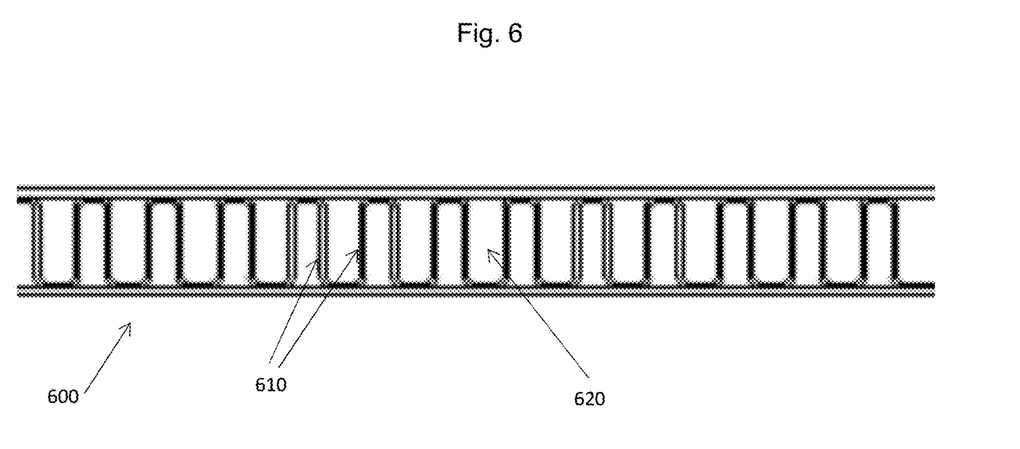
FIG. 6 shows the interior of a cooling panel according to one preferred embodiment.

According to one preferred embodiment, the reactor outlet heat exchanger 517 is made of a plurality of hollow panels 600 that may contain fins 610 in which the coolant flows through interior spaces 620, as shown in FIG. 6. The exhaust gas and particles flow through passages 700 formed between exterior surfaces of the panels 600, shown in FIG. 7. The reactor outlet heat exchanger 517 can be cooled with a variety of types of fluid, such as air, water, or other known cooling media.

Figure 7:
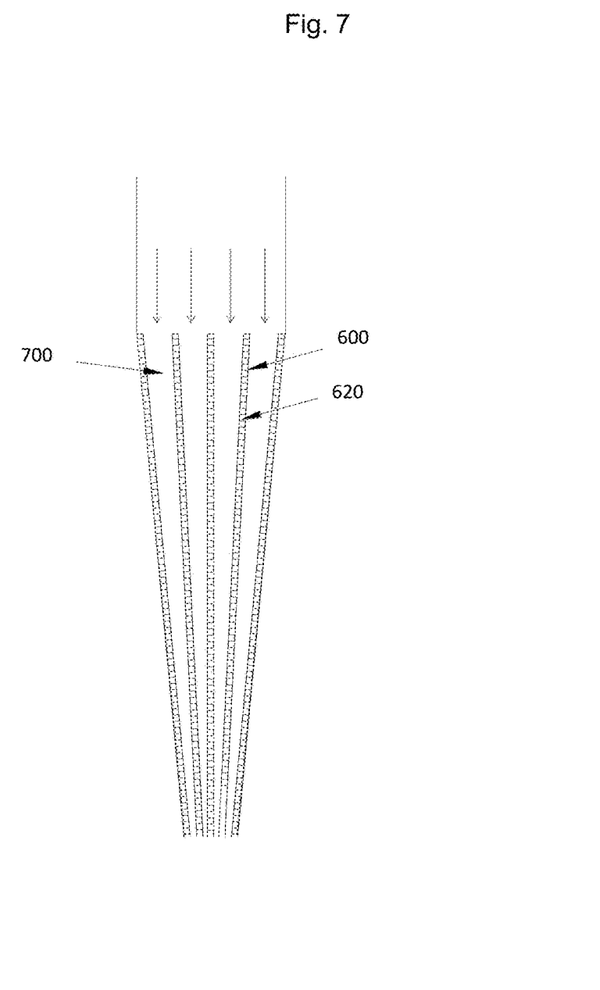
FIG. 7 shows a vertical cross-section of the reactor outlet heat exchanger showing the cooling path.

The heat exchanger 517 has four heat exchanger passageways. The particles entering the heat exchanger 517 are still in the form of particle curtains, and the two particle curtains enter two center heat exchanger passageways while the gas is split across all four heat exchanger passageways. Cold coolant fluid flows into inlet 519, through the interior finned passageways of the heat exchanger panels counterflow to the process flow, and out of outlet 518.

For economic benefit, the heat removed from the bottom of the reactor is used to preheat process flows coining into the reactor. This heat can also supplement drying the FeO ore before entering the reactor. That is, the fluid used to cool the exhaust gas and particles absorbs heat that may be directed to the hydrogen preheater and iron ore preheater, such that the heat removed from the reactor outlet is recovered and used to preheat the reactor inlet. There may be enough heat left over after preheating that the coolant can be further directed to provide some heat for drying the incoming ore.

The process flow exits the reactor outlet heat exchanger 517 and enters the high efficiency cyclone 520. The cyclone uses centrifugal force to push the particles towards the outer walls and down to the outlet lock hopper 522. The gas, being of lighter density than Fe particles, moves toward the center of the cyclone and up the exhaust tube 521 where it is sent to gas recovery equipment to condense the water and purify remaining $H_2$.

The outlet lock hopper 522 is located beneath the cyclone and provides a place where the particles can collect and, at regular intervals, the exhaust gas can be exchanged with nitrogen or other inert gas. This gas exchange prevents reoxidation of the Fe to FeO.

More specifically, in the outlet lock hopper 522, an internal valve (not shown) between the lock hopper 522 and the bagging machine hopper 523 is closed. When the lock hopper 522 is filled to desired level, an internal valve (not shown) between the lock hopper 522 and the cyclone 520 is closed. Nitrogen is injected into the lock hopper and the hydrogen is vented from the lock hopper. When the venting is complete, all vents are closed, the internal valve between the lock hopper 522 and the bagging machine 523 is opened, the Fe particles are staged for bagging.

There are various types of bagging machines and many types of preparation for shipment methods that can be applied to the Fe particles at this stage. The bagging machine 523 serves to gather, protect, and store the final product for shipping or use. In this preferred embodiment, the bagging machine 523 uses bags made with a combination of paper and plastic to protect the iron from $H_2O$ exposure (via the plastic) and to provide handling strength (via the paper). Additional protection for the Fe particles may be provided by adding nitrogen into the Fe shipping container. This bagging system can easily be interchanged with various other bagging systems depending on the final use of the particles and customer desire. The material may be stored in many types of bulk material handling containers, or alternatively it may be processed as CBI (cold bricked iron), pellets, or heated to make HBI (hot bricked iron) or HM (hot metal).

According to one preferred embodiment, the total furnace system height is about 110 feet. That includes a susceptor that is 5 feet long and a muffle that is 25 feet long. This combined length of 30 feet provides a residence time of 10 seconds. The particles are heated up to the desired reaction temperature within the first 3 feet of the susceptor, and the reaction continues as they fall through the remaining portion of the susceptor and the muffle. This embodiment includes a cooling section that is 24 feet long, and a length of 5 feet above the susceptor between the rotary particle feeder and the susceptor.

Figure 8:
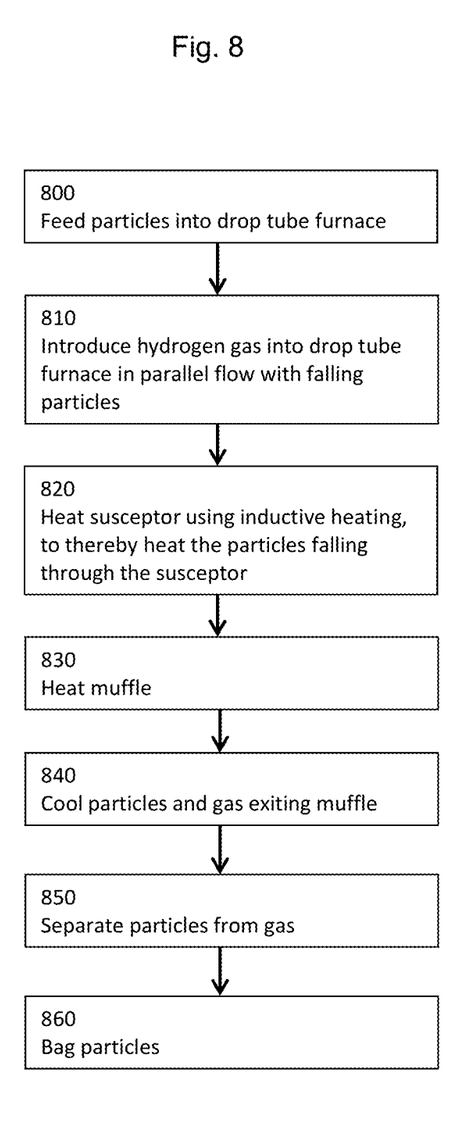
FIG. 8 is a flow chart showing a method for reducing iron ore to iron according to one preferred embodiment.

A preferred embodiment of a method of reducing iron ore to iron will be described with respect to FIG. 8. (Those skilled in the art will appreciate that the specific steps described below are not necessarily performed in sequence or in the particular sequence described.) In step 800, particles are fed into the drop tube furnace. More specifically, particles are fed into the drop tube furnace with a volume flow rate low enough to provide a dilute particle curtain. As described above, particles can be introduced using more than one particle feeder (i.e., in more than one location) to provide more than one particle curtain. In step 810, hydrogen gas is introduced into the drop tube furnace. In particular, the hydrogen gas is introduced so as to flow in parallel with the falling particles, and in such a way as to create laminar flow that will not disturb the dilute particle curtain (s). In step 820, inductive heating is used to heat a susceptor, which in the preferred embodiment is a graphite susceptor, The falling particles are thereby heated by an indirect heat source as they fall through the susceptor. In particular, the susceptor is heated by inductive heating and then the particles are heated by heat radiated from the susceptor.

In step 830, the muffle is heated to maintain the particle temperature as the reaction continues while the particles fall through the muffle. In the preferred embodiment, the muffle is heated with one or more resistance heaters, but another type of heating, such as inductive heating, may also be used. In step 840, the particles and gas that have passed through the susceptor and the muffle are cooled. Then, in step 850, the particles are separated from the gas, and in step 860 the particles are bagged.

As described above, the flash ironmaking system and method described herein can reduce iron ore to iron in a matter of seconds. By way of comparison, the reaction in a blast furnace takes on the order of 8 hours. The reaction in a DRI reactor takes on the order of 11-12 hours. (Some techniques have been experimented with that may permit a reaction to occur in a period on the order of 20-40 minutes, but that is still far longer than the reaction time of seconds achieved by the flash iron process.)

The present invention has been described above with respect to particular preferred embodiments. However, the details of the specific exemplary embodiments should not be construed as limitations on the scope of the invention. Rather, the scope of the invention should be measured by the following claims.

We claim:

1. A flash ironmaking drop tube furnace comprising:
   a primary reaction section having
      a refractory,
      an induction coil around the refractory,
      insulation located between the refractory and the induction coil, and
      a susceptor located inside the refractory, the susceptor being formed of a material that is heated by induction when electrical current flows through the induction coil, and having at least one interior channel through which particles can pass;
   a muffle, located below the primary reaction section;
   an outer shell surrounding the muffle;
   at least one heater located adjacent to the muffle;
   insulation located between the at least one heater and the outer shell;
   at least one particle feeder that feeds a predetermined volume of particles into the furnace above the primary reaction section, the at least one particle feeder including at least one rotary valve; and
   an inlet port for injecting gas into the furnace, the inlet port being located so that the gas flows through the susceptor and then through the muffle in parallel with the particles.

2. A flash ironmaking drop tube furnace according to claim 1, wherein the at least one rotary valve comprises a particle inlet, a discharge outlet, and a rotatable rod located between the particle inlet and the discharge outlet, the rotatable rod having a plurality of grooves in the outer surface of the rod arranged parallel to the axis of rotation.

3. A flash ironmaking drop tube furnace according to claim 2, wherein the at least one rotary valve feeds particles into the furnace with a volume small enough to create a dilute particle curtain.

4. A flash ironmaking drop tube furnace according to claim 3, wherein the at least one rotary valve feeds particles into the furnace at a volume of ¼ teaspoons per second per inch.

5. A flash ironmaking drop tube furnace according to claim 1, wherein the susceptor is formed of graphite.

6. A flash ironmaking drop tube furnace according to claim 1, wherein the at least one heater is a resistance heater.

7. A flash ironmaking drop tube furnace system comprising:
- a primary reaction section having
    - a refractory,
    - an induction coil around the refractory,
    - insulation located between the refractory and the induction coil, and
    - a susceptor located inside the refractory, the susceptor being formed of a material that is heated by induction when current flows through the induction coil, and having at least one interior channel through which particles can pass;
- a muffle, located below the primary reaction section;
- an outer shell surrounding the muffle;
- at least one heater located adjacent to the muffle;
- insulation located between the at least one heater and the outer shell;
- a particle feeder that feeds a predetermined volume of particles into the furnace system above the primary reaction section;
- an inlet port for injecting gas into the furnace system, the inlet port being located so that the gas flows through the susceptor and then through the muffle in parallel with the particles; and
- a particle preheating section located above the particle feeder that preheats the particles before the particle feeder feeds them into the furnace system.

8. A flash ironmaking drop tube furnace system according to claim 7, further comprising a heat exchanger located below the muffle to cool particles and exhaust gas exiting the muffle.

9. A flash ironmaking drop tube furnace system according to claim 8, further comprising a cyclone to separate the particles from the exhaust gas after cooling.

10. A flash ironmaking drop tube furnace system according to claim 9, further comprising a bagging device located below the cyclone.

11. A flash ironmaking drop tube furnace system according to claim 7, wherein the at least one particle feeder comprises a particle inlet, a discharge outlet, and a rotatable rod located between the particle inlet and the discharge outlet, the rotatable rod having a plurality of grooves in the outer surface of the rod arranged parallel to the axis of rotation.

12. A flash ironmaking drop tube furnace system according to claim 11, wherein the at least one particle feeder feeds particles into the furnace system with a volume small enough to create a dilute particle curtain.

13. A flash ironmaking drop tube furnace system according to claim 12, wherein the at least one particle feeder feeds particles into the furnace system at a volume of ¼ teaspoons per second per inch.

14. A flash ironmaking drop tube furnace system according to claim 7, wherein the susceptor is formed of graphite.

15. A flash ironmaking drop tube furnace system according to claim 7, wherein the at least one heater is a resistance heater.

* * * * *